United States Patent [19]

Kao

[11] Patent Number: 5,562,013
[45] Date of Patent: Oct. 8, 1996

[54] ADJUSTABLE BICYCLE STEM

[76] Inventor: Yu-Chen Kao, 2, Alley 1, La. 29, Sec. 2, Pei-Shin Rd., Shin-Tien City, Taipei Hsien, Taiwan

[21] Appl. No.: 552,305

[22] Filed: Nov. 2, 1995

[51] Int. Cl.⁶ .................................................. B62K 21/16
[52] U.S. Cl. ............................................ 74/551.3; 403/81
[58] Field of Search ........................... 74/551.1, 551.3, 74/551.6; 280/279, 280; 403/81

[56] References Cited

U.S. PATENT DOCUMENTS

| | | | |
|---|---|---|---|
| 589,671 | 9/1897 | Palmiter | 403/81 |
| 619,452 | 2/1899 | Vose | 403/81 |
| 642,710 | 2/1900 | Palmer | 403/81 |

Primary Examiner—Charles A. Marmor
Assistant Examiner—Mary A. Battista
Attorney, Agent, or Firm—Bacon & Thomas

[57] ABSTRACT

An adjustable bicycle stem structure comprising a horizontal tube and a longitudinal tube, one end of the longitudinal tube is provided with a rotatable shuttle-shaped threaded tube, and the corresponding end of the horizontal tube is provided with a push member. The external edge of the push member is provided with a row of toothed slots, which are distributed in the shape of a recessed arc. The toothed slots are made to mesh with the protruded threads of the threaded tube. When the shuttle-shaped threaded tube is rotating, it drives the push member to displace up and down following the threads on the threaded tube, allowing the horizontal tube to be adjusted up and down.

5 Claims, 5 Drawing Sheets

ADJUSTABLE BICYCLE STEM

BACKGROUND OF THE INVENTION (a) Field of the Invention

The present invention relates to an adjustable bicycle stem, particularly to an improved structure in which the horizontal tube can be adjusted to an upward or downward position, this improved structure uses a rotatable shuttle-shaped threaded tube to cooperate with a push member for adjusting the angle of the horizontal tube.

(b) Description of the Prior Art

Conventional bicycle stems consist of a horizontal C-shaped connector and a longitudinal C-shaped connector, these connectors are respectively provided for adapting the handle and steering tube of the bicycle. The shape of the stem can either be straight or formed into an inverted L-shaped stem, however, these tubes are integrated into one piece, they do not provide any adjustment for the horizontal tube and the longitudinal tube.

SUMMARY OF THE INVENTION

The main object according to the present invention is to provide an adjustable stem for bicycles. The structure uses a shuttle-shaped threaded tube having protruded threads to cooperate with a push member having a row of toothed slots at its edge. The threaded tube and the toothed slots, which are meshed with each other, are respectively provided at the connecting end of the horizontal tube and the longitudinal tube. The threaded tube tapers from the center towards both ends, forming a cylindrical body with a protruded arc surface. This surface is provided with threads which are made to mesh with the row of toothed slots provided on push member. When the push member is meshed with the center threads of the threaded tube, it stays in the horizontal position; when the threaded tube is rotated clockwise or counter clockwise direction, the variation in the position of push member can create different angular positions (up and down) of the horizontal tube.

Another object according to the present invention is to provide an adjustable bicycle stem in which a drive bolt is used to feed through the threaded tube, allowing the drive bolt to be retained in the threaded tube.

DETAILED DESCRIPTION OF THE PREFERRED EMBODIMENT

Figure 1:
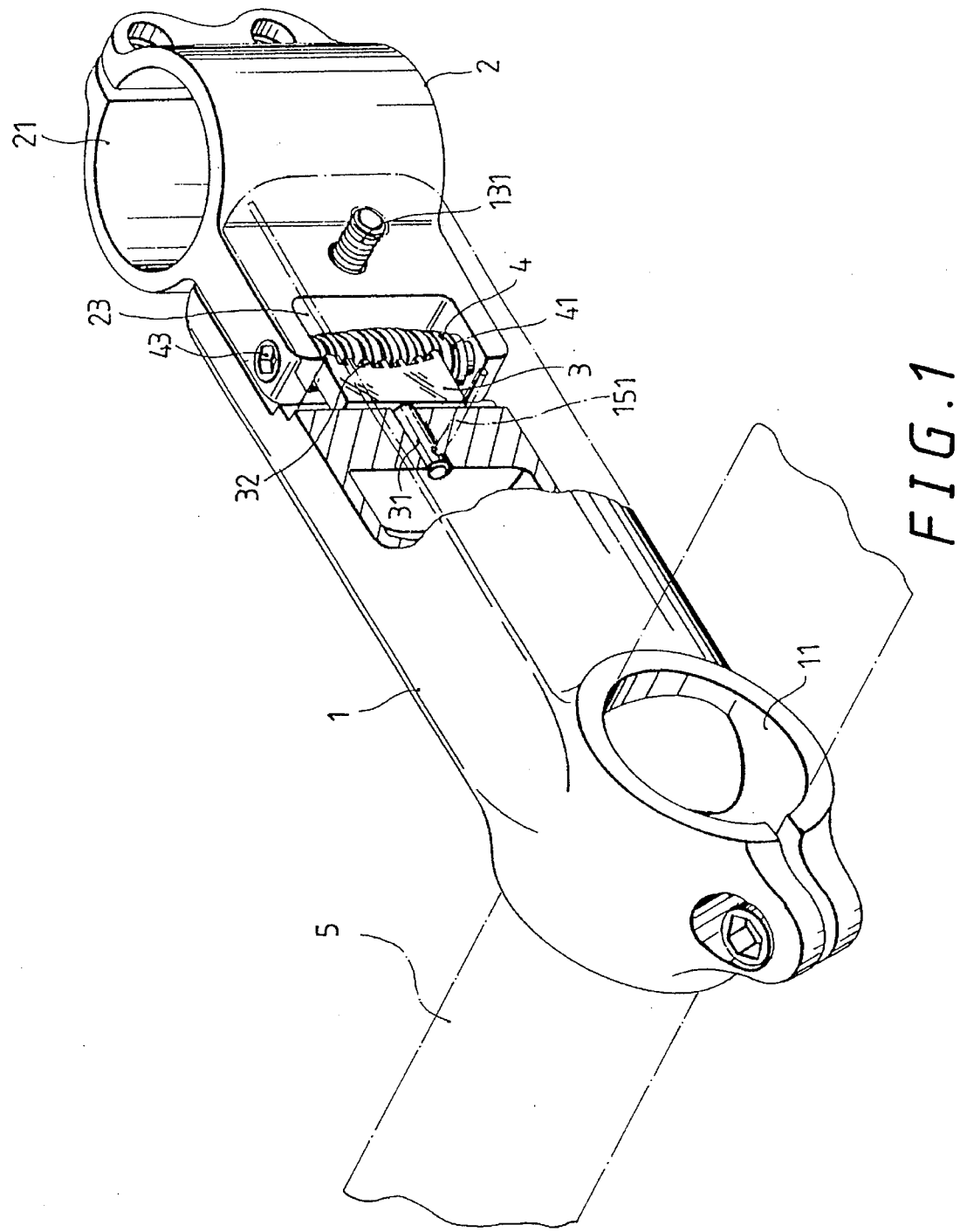
FIG. 1 is a partial perspective view of a first embodiment of the present invention.
Figure 2:
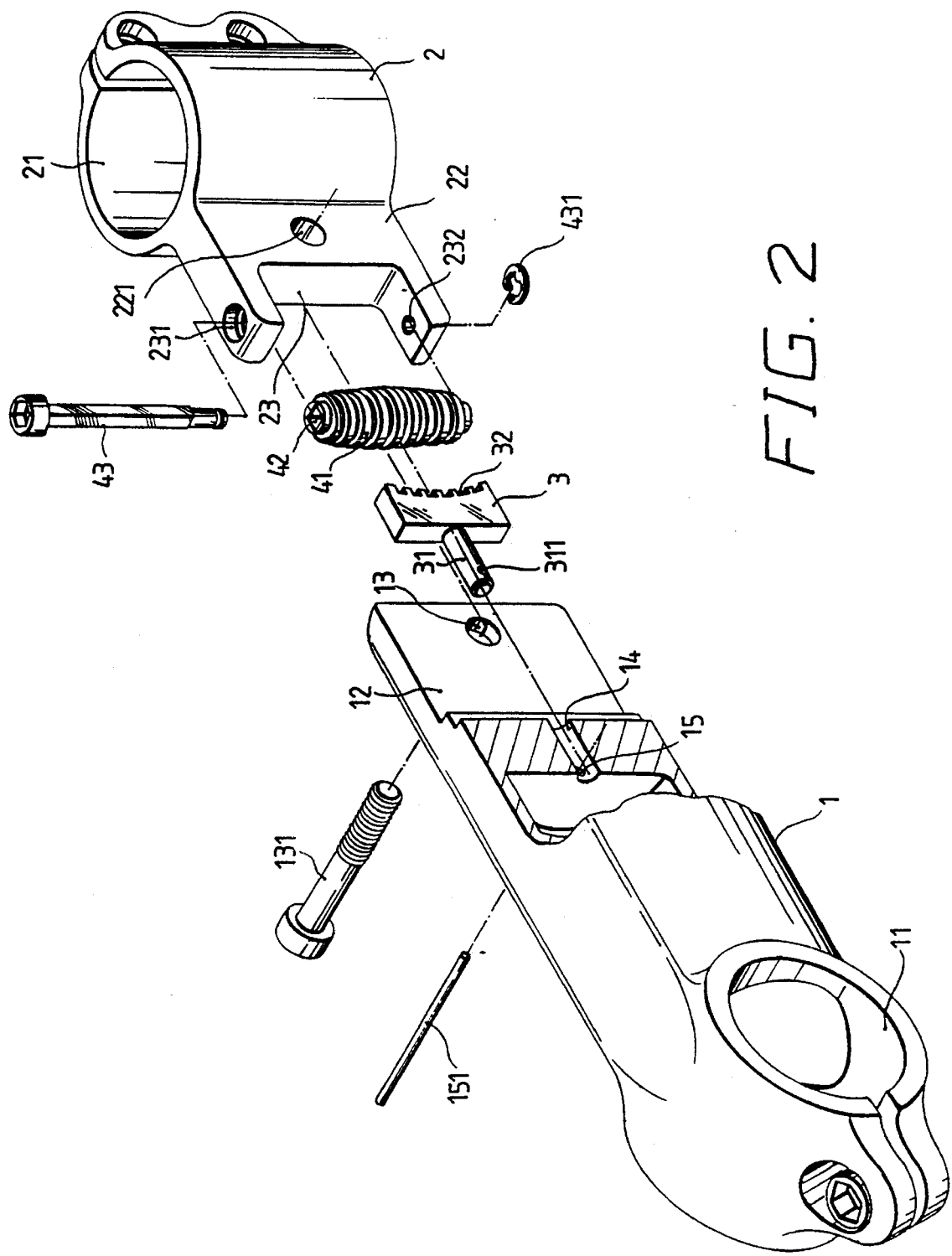
FIG. 2 is an exploded perspective view of the embodiment shown in FIG. 1.

As shown in FIGS. 1 and 2, the bicycle stem structure of the present invention consists of a horizontal tube 1, a longitudinal tube 2, a push member 3 and a shuttle-shaped threaded tube 4. The outward end of the horizontal tube 1 is provided with a C-shaped clamp 11 in the lateral direction, such clamp is used for securing and integrating with the handlebar 5; the other end of the horizontal tube 1 is provided with a longitudinal slit 12, which is used to accommodate the above-mentioned push member 3. The two side walls of the longitudinal slit 12 are respectively provided with a corresponding pivotal hole (or screw hole) 13, and the inner wall on the bottom is provided with a hole 14; in addition, the tube wall corresponding to hole 14 is provided with a pin hole 15.

The longitudinal tube 2 has a vertical C-shaped clamp 21 at one end, such a clamp is used to cooperate with the assembly of the bicycle steering tube; the other end is provided with an extension plate 22, which has a pivotal hole 221 for cooperating a bolt 131 (or any other suitable connecting part) so that the bolt can feed through the pivotal holes 13 and 221 for securing purpose. The forward end of the extension plate 22 of the longitudinal tube 2 is provided with a recessed opening 23, the top and bottom walls of which are respectively provided with positioning holes 231 and 232. The positioning holes and the recessed opening are provided to accommodate the shutter-shaped threaded tube 4 so that the latter can be rotatably positioned therein.

The push member 3 is formed into a T-shaped piece having a stem 31 at its rearward end, its forward end is provided with a row of toothed slots 32, which are formed into a recessed arc surface. The number of toothed slots depends on the needs, it may be increased or decreased. The wall of the stem is provided with a pin hole 311, when the stem 31 is inserted into hole 14 of the horizontal tube 1, a securing pin 151 can be used to feed through pin hole 15 of the horizontal tube 1 and the pin hole 311 of stem 31, thereby allowing push member 3 to be secured into the longitudinal slit 12 of the horizontal tube 1.

The threaded tube 4 has shaped into a long shuttle-shaped tube, the tube tapers from the center towards both ends, forming a cylindrical body with a protruded arc surface. This surface is provided with threads 41 which are made to mesh with the row of toothed slots provided on push member 3. In addition, the threaded tube is also provided with an internal hole 42, which accepts drive bolt 43 feeding from the top to the bottom of the hole. Drive bolt 43 is retained by a C-shaped washer 431 so that threaded tube 4 can be movably secured into the recessed opening 23 of the longitudinal tube 2. Thus, when the drive bolt 43 is turned, the shuttle-shaped threaded tube 4 can be turned freely at the same time. The integration of drive bolt 43 into the internal hole 42 is to produce a retaining effect for the two components, it is obvious that the drive bolt 43 can be omitted. In such case, the shuttle-shaped threaded tube 4 (it may also be a solid body) can be formed and shaped to fit into the positioning holes 231 and 232 of the recessed opening 23 of the longitudinal tube 2; in addition, the upper part of the threaded tube 4 is provided with a hex socket, a hex nut, a philip screw or a regular screw so that appropriate hand tools (such as a wrench, a flat or a philip screw driver) can be used to turn the threaded tube 4 for free rotation.

Figure 3:
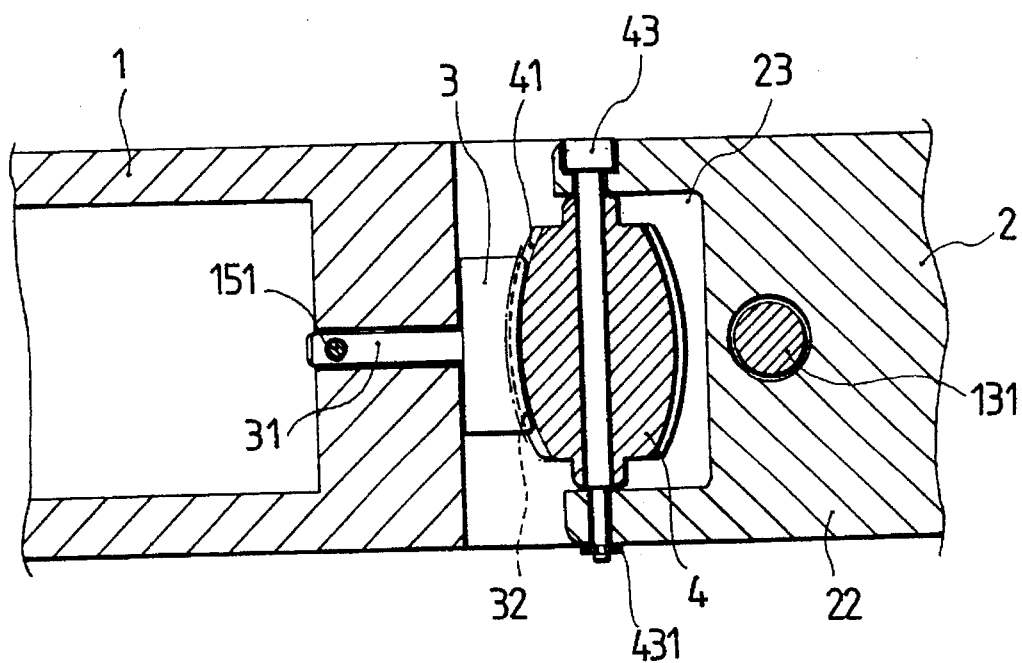
FIG. 3 is a cross-sectional view showing the pivotal connection between the longitudinal and horizontal tubes with the horizontal tube in the horizontal position.
Figure 4:
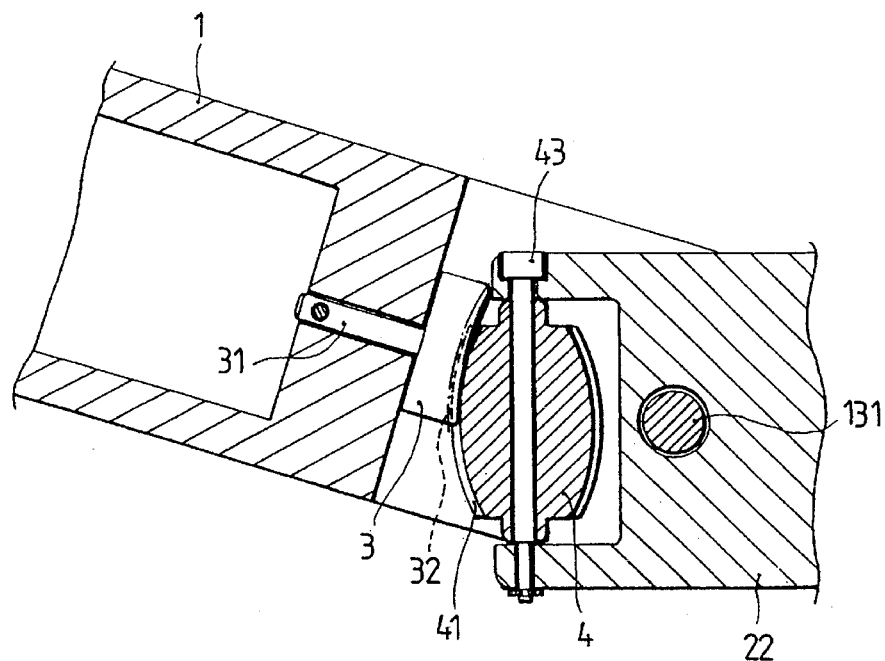
FIG. 4 is a cross-sectional view showing the pivotal connection between the longitudinal and horizontal tubes with the horizontal tube in the upward position.
Figure 5:
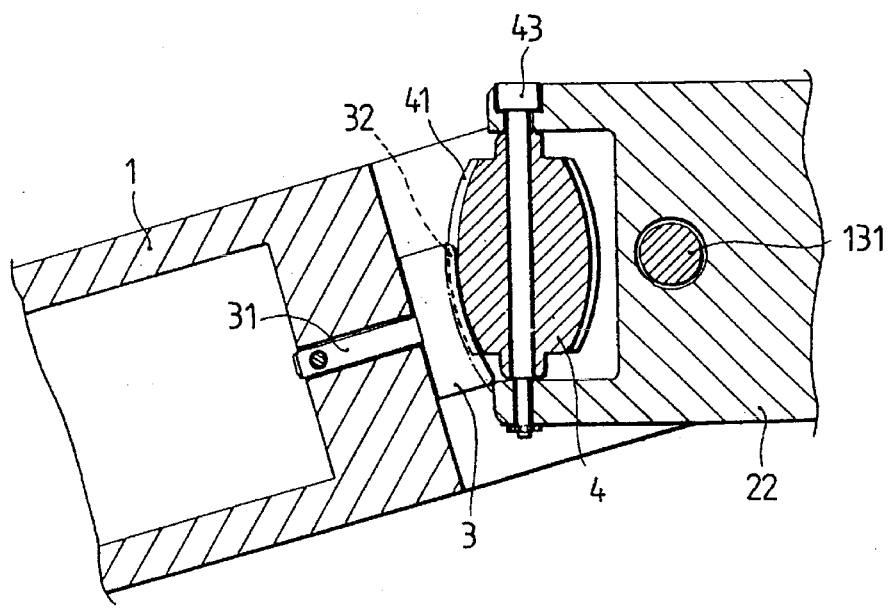
FIG. 5 is a cross-sectional view showing the pivotal connection between the longitudinal and horizontal tubes with the horizontal tube in the downward position.

By such configuration, the threaded tube 4 can be turned to rotate in the clockwise or counter clockwise direction, its contact with toothed slots 32 of the push member 3 enables the horizontal tube 1 to swing up and down at various angle so as to permit changing the pivotal angle of the horizontal tube 1 and the longitudinal tube 2 at users' desire. In other words, when the push member 3 is meshed with the center threads of the threaded tube 4, it stays in the horizontal position, as is shown in FIG. 3; however, when the threaded tube 4 is rotated clockwise or counter clockwise direction, the variation in the position of push member 3 can create different angular positions (up and down) of the horizontal tube 1, as are shown in FIGS. 4 and 5. The bolt 131 needs to be loosened first before adjustment, when the horizontal tube 1 is adjusted to a desired position, the bolt can be tightened again.

Figure 6:
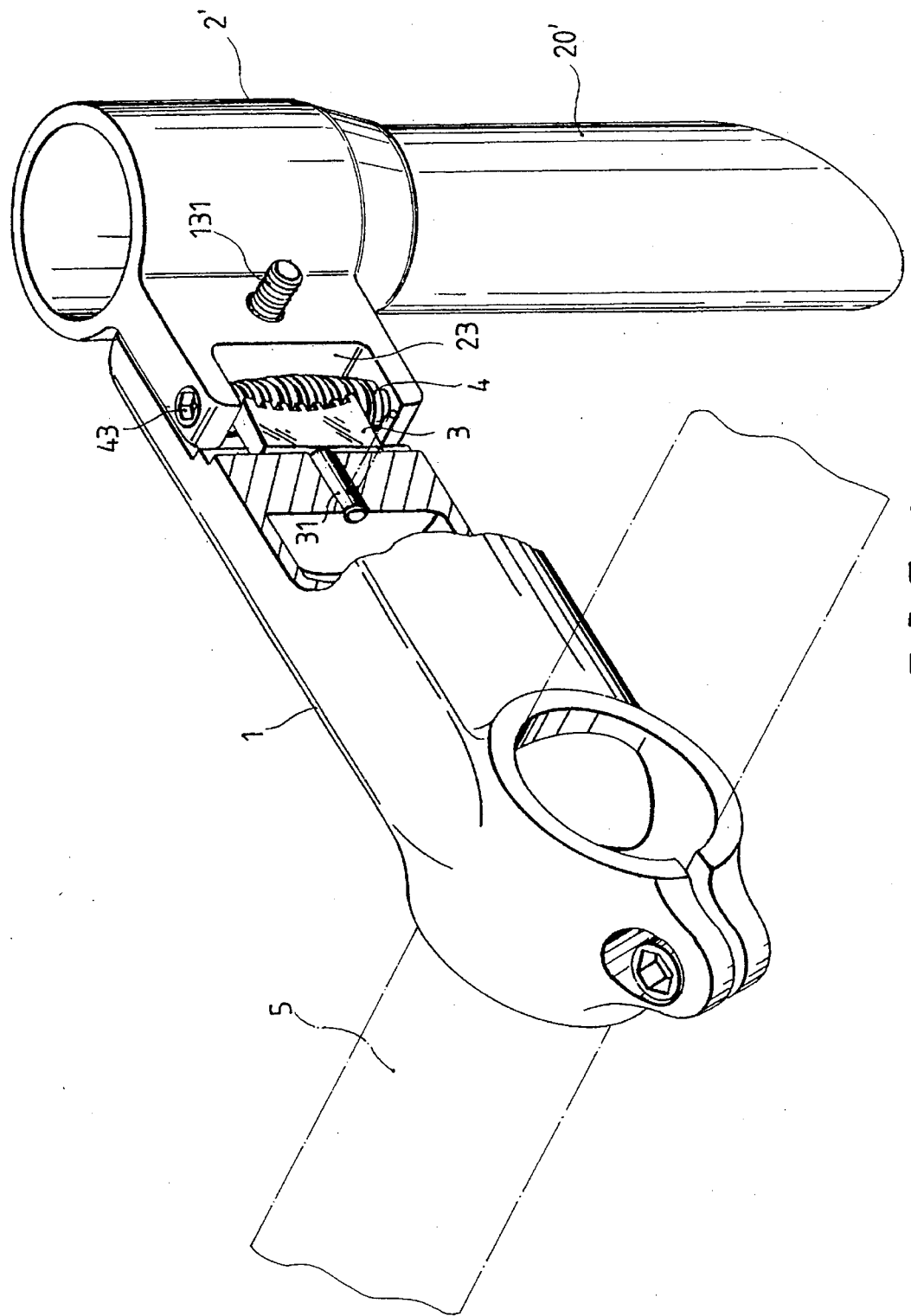
FIG. 6 is a partial perspective view of another embodiment using a longitudinal tube according to the present invention.

The shape of the above-mentioned longitudinal tube 2 can also be modified such that longitudinal tube 2' can be extended to include a vertical tube 20', as is shown in FIG. 6. However, this modification can be carried out without departing from the scope of the present invention. In addition, the pivotal connection of the horizontal tube 1 and the longitudinal tube 2 can be accomplished by using one-half of a sectional stem and arrange them in a crisscross pattern (at this time the push member 3 and the threaded tube 4 are exposed). This is another embodiment of the present invention.

It is understood that the forgoing description and accompanying illustrations are merely exemplary, and various changes and modifications to the preferred embodiments will be apparent to those skilled in the art. The scope of this invention is defined solely by the appended claims and their equivalents.

What is claimed is:

1. An adjustable bicycle stem comprising:
   a. a horizontal tube;
   b. a longitudinal tube;
   c. a push member; and
   d. a shuttle-shaped threaded tube;

wherein an end of said horizontal tube is provided with a lateral C-shaped clamp and the other end of said horizontal tube is provided with a longitudinal slit having two side walls, the two side walls of the longitudinal slit are respectively provided with a corresponding pivotal hole, and an inner wall of the horizontal tube is provided with a hole; in addition, the hole is provided with a pin hole through a wall thereof;

said longitudinal tube has a vertical C-shaped clamp at one end, and the other end of said longitudinal tube is provided with an extension plate, which has a pivotal hole for adapting a bolt which feeds through the pivotal holes for securing purposes, an end of the extension plate of the longitudinal tube is provided with a recessed opening having top and bottom walls, the top and bottom walls of which are respectively provided with positioning holes;

said push member is formed into a T-shaped piece having a stem at its rearward end, its forward end is provided with a row of toothed slots, a wall of the stem is provided with a pin hole, when the stem is inserted into said hole of the horizontal tube, a securing pin is fed through said pin hole of the horizontal tube and the pin hole of said stem, thereby allowing said push member to be secured into the longitudinal slit of said horizontal tube;

said threaded tube has the shape of a long shuttle-shaped tube, the threaded tube tapers from its center towards both ends, forming a cylindrical body with a protruded arc surface, said surface is provided with threads which mesh with the row of toothed slots provided on said push member, in addition, said threaded tube is movably secured into the recessed opening of the longitudinal tube;

whereby when said threaded tube is rotated in the clockwise or counter clockwise direction, its contact with the row of toothed slots of said push member enables the horizontal tube to swing up or down at various angles.

2. An adjustable bicycle stem as recited in claim 1 wherein said threaded tube is provided with an internal hole, which accepts a drive bolt, said drive bolt is retained by a C-shaped washer so that the threaded tube can be movably secured into the recessed opening of the longitudinal tube.

3. An adjustable bicycle stem as recited in claim 1 wherein said threaded tube is a solid body and is formed and shaped to fit into the positioning holes of the recessed opening of the longitudinal tube, in addition, an upper part of said threaded tube is provided with one taken from the group consisting of a hex socket, a hex nut, a philip screw or a regular screw so that any appropriate hand tool can be used to turn said threaded tube for free rotation.

4. An adjustable bicycle stem as recited in claim 1 wherein said longitudinal tube is extended to include a vertical tube.

5. An adjustable bicycle stem as recited in claim 1 wherein the row of toothed slots are distributed in a recessed arc surface so as to mesh with the threads of the threaded tube.

* * * * *